(12) United States Patent
Suehira

(10) Patent No.: US 6,922,697 B1
(45) Date of Patent: Jul. 26, 2005

(54) STRUCTURED DOCUMENT PREPARATION METHOD AND COMPUTER-READABLE RECORDING MEDIUM ON WHICH A STRUCTURED DOCUMENT IS RECORDED

(75) Inventor: Seishi Suehira, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/441,074

(22) Filed: Nov. 16, 1999

(30) Foreign Application Priority Data

May 21, 1999 (JP) .......................................... 11-141174

(51) Int. Cl.⁷ .............................................. G06F 17/21
(52) U.S. Cl. ...................................... 707/102; 715/513
(58) Field of Search .......................... 715/513; 707/101, 707/102, 513; 709/246

(56) References Cited

U.S. PATENT DOCUMENTS

| | | | |
|---|---|---|---|
| 5,655,130 A | * 8/1997 | Dodge et al. | ................ 395/772 |
| 6,012,098 A | * 1/2000 | Bayeh et al. | ................ 709/246 |
| 6,014,680 A | * 1/2000 | Sato et al. | .................. 707/513 |
| 6,021,202 A | * 2/2000 | Anderson et al. | ............. 380/25 |
| 6,061,697 A | * 5/2000 | Nakao | ......................... 707/513 |
| 6,279,006 B1 | * 8/2001 | Shigemi et al. | ............. 707/101 |
| 7,510,718 | * 2/2003 | Wanderski et al. | ......... 715/513 |

FOREIGN PATENT DOCUMENTS

| | | | |
|---|---|---|---|
| JP | 10-116275 | 5/1998 | ........... G06F/17/21 |
| JP | 10-187726 | 7/1998 | ........... G06F/17/27 |

* cited by examiner

*Primary Examiner*—Greta Robinson
*Assistant Examiner*—Sathyanarayan Pannala
(74) *Attorney, Agent, or Firm*—Staas & Halsey LLP (57) ABSTRACT

The invention provides a structured document preparation method wherein a plurality of different logical structures can be defined with a single document type definition so that structured documents of a plurality of logical structures can be prepared and managed readily. A plurality of element declarations which respectively define a plurality of different logical structures and also a plurality of entity declarations which respectively designate the defined different logical structures are described into a document type definition, and one of the plurality of entity declarations is validated to validate a corresponding one of the plurality of element declarations. Then, a structured document is prepared with the logical structure defined by the validated element declaration.

14 Claims, 5 Drawing Sheets

```
                                I1a
                                 ↓
EN1a   <!ENTITY % hierarchy "INCLUDE">        <!--DIAGNOSIS CHART IS REGARDED AS OF
                                                  HIERARCHICAL STRUCTURE. VALID AT PRESENT-->
EN2a   <!ENTITY % table "IGNORE">             <!--DIAGNOSIS CHART IS REGARDED AS OF
                              ↓                   TABLE FORM. INVALID AT PRESENT-->
                              I2a
       <![ %table; [
       <!ELEMENT row O O    (a1?, a2?, a3?, a4?, a5?, a6?, a7?)>
EL1a   <!ELEMENT  (a1 | a2 | a3 | a4)  -O  (name?, topic*)>
       <!ELEMENT a5.   -O   (#PCDATA)   >
       ]]>
       <![ %hierarchy; [
EL2a   <!ELEMENT D   -O   (colspec*, head  (a1+ | a4+))>
       ]]>                                          ←20
```

FIG. 4

```
            <!DOCTYPE card system "example.dtd" [
EN1a ──►<!ENTITY % hierarchy  "IGNORE">
EN2a ──►<!ENTITY % table     "INCLUDE">──I1a
         ]>                              ↑
                    ↑                    I2a
                    40
```

```
<![ %table; [
<!ELEMENT row  O O  (a1?, a2?, a3?, a4?, a5?, a6?, a7?)>
<!ELEMENT (a1 | a2 | a3 | a4)  -O   (name?, topic*)>  ) >
<!ELEMENT a5         -O       (#PCDATA)    >
]]>
```

FIG. 7
RELATED ART

```
<![ %hierarchy; [
<!ELEMENT D -O    (colspec*, head (a1+ | a4+))>
]]>
```

STRUCTURED DOCUMENT PREPARATION METHOD AND COMPUTER-READABLE RECORDING MEDIUM ON WHICH A STRUCTURED DOCUMENT IS RECORDED

BACKGROUND OF THE INVENTION

1) Field of the Invention

This invention relates to a method of preparing a structured document such as, for example, an SGML (Standard Generalized Markup Language) document in accordance with a predetermined document type definition and a computer-readable recording medium on which a structured document is recorded.

2) Description of the Related Art

Generally, an SGML (Standard Generalized Markup Language) document which employs a text format to represent, as document contents, document data except layout information and some other information is known as a structured document.

The SGML document can define a logical structure of the document by applying a symbol (mark) called tag for identification of the structure of the document and is being spreading as a document of a standard language for storage/retrieval or exchange of a document.

The SGML document includes an SGML declaration which describes various references such as a type of a character code used in the document, a DTD (Document Type Definition) which defines a mutual relationship between document elements, that is, a document structure, and a document instance which indicates contents of the document.

The DTD defines tags to be applied to elements (index, body, list and so forth) of the document and particularly includes element declarations which define elements of the document, relations of inclusion between the elements, an order in which the elements are arranged, the numbers of times of appearance of the elements and so forth, attribute declarations which define attributes of the elements, entity declarations which declare methods of taking special characters, pictures and so forth into the document, and other necessary declarations. The DTD can define memberships, an order of appearance, the numbers of times of appearance and so forth of the gaps in the form of a tree structure.

In order to prepare an SGML document, a document structure for the SGML, that is, a DTD, is produced or acquired first, and then a document instance which conforms with the DTD is produced.

Where the preparation of an SGML document involves preparations of different SGML documents having different logical structures from each other, a DTD suitable for a logical structure is produced or acquired for each of the logical structures.

Figure 6:
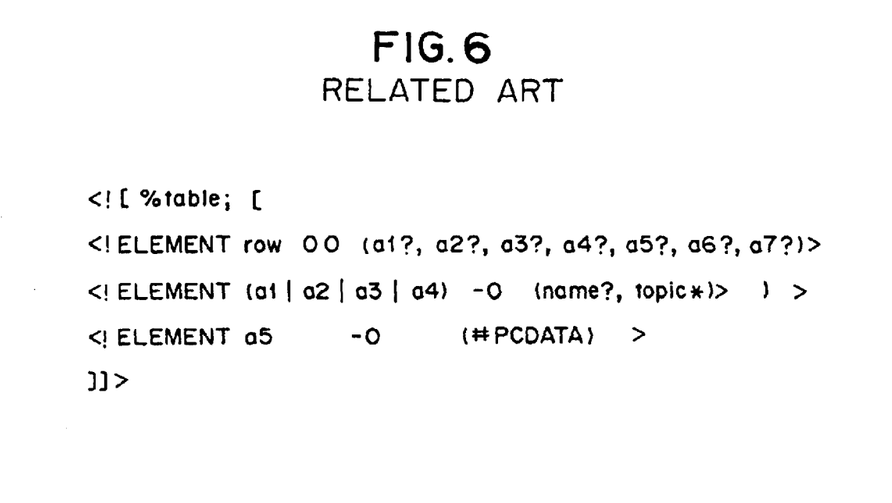
FIG. 6 is a view illustrating an example of description of a DTD which defines a logical structure of an ordinary table form layout.

Here, examples of description of DTDs (element declarations) for a table form layout and a hierarchical structure form layout as examples of a logical structure are described with reference to FIGS. 6 and 7. FIG. 6 shows an example of description of an element declaration of a DTD which defines a logical structure of the table form layout, and FIG. 7 shows an example of description of a factor declaration of a DTD which defines a logical structure of the hierarchical structure form layout.

An SGML document of the table form layout defined by such a DTD as shown in FIG. 6 is suitable for preparation and display of a table and is suitably applied, for example, to display a table as a template upon inputting of an SGML document so that a composer may describe contents in cells in accordance with the template and display the table on a display unit or print the table.

Figure 7:
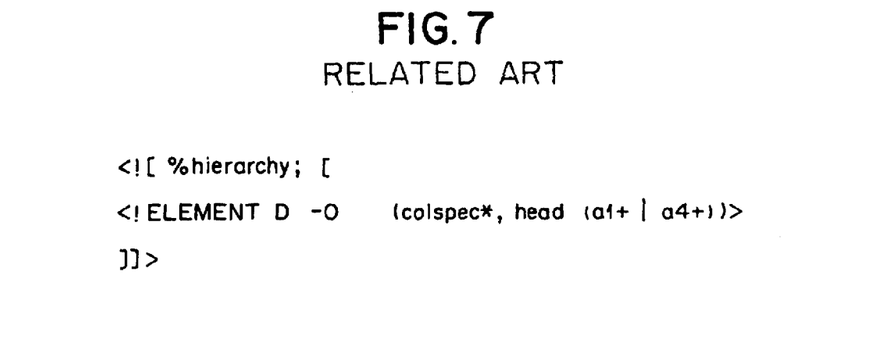
FIG. 7 is a view illustrating an example of description of a DTD which defines a logical structure of an ordinary hierarchical structure form layout.

Meanwhile, an SGML document of the hierarchical structure form layout defined by such a DTD as shown in FIG. 7 is suitably applied, for example, to register the prepared document into an SGML database and retrieve desired information from within the database.

The DTD which defines a logical structure of the table form layout and the DTD which defines a logical structure of the hierarchical structure form layout have different structures from each other as seen from FIGS. 6 and 7, and a composer prepares an SGML document using a DTD which defines a logical structure suitable for an application of the SGML document. In short, the composer produces or acquires a DTD corresponding to the type of the logical structure and prepares an SGML document based on the DTD.

In such a structured document preparation method as described above, however, if it is tried to use a document to a different application as an SGML document, then a DTD which defines a logical structure suitable for the application must be produced or acquired and then an SGML document must be prepared using the DTD. Therefore, the structured document preparation method has a subject to be solved in that the operation mentioned is cumbersome and imposes a heavy burden to the composer.

For example, in order to display or print contents of a document as a table and besides register them into a database for later utilization, a DTD which defines a logical structure of the table form layout and another DTD which defines a logical structure of the hierarchical structure form layout must be produced and besides, for each of the types of the logical structures, an SGML document having a DTD corresponding to the type of the logical structure must be prepared. In short, a number of SGML documents whose document contents are identical but whose DTDs are different from each other equal to the number of types of logical structures (here, two) must be prepared.

Further, while an SGML document prepared is used, it sometimes becomes necessary to edit the DTD of the SGML document such as to newly add a document element (tag) in order to augment the convenience of use of the SGML document. However, when a document element (tag) is to be newly added to a plurality of SGML documents prepared individually with different logical structures or in a like case, the DTDs of the SGML documents must be edited (addition of the new element) without a miss in order to unify the contents of the SGML documents for the object of management of the SGML documents. However, when the DTDs of the SGML documents are edited as described above, the composer of the SGML documents must take care so that no miss may occur in the editing. Therefore, the structured document preparation method has another subject to be solved in that the management imposes a heavy burden on the composer.

SUMMARY OF THE INVENTION

It is an object of the present invention to provide a structured document preparation method and a computer-readable recording medium with a structured document recorded thereon wherein a plurality of different logical structures can be defined with a single document type definition so that structured documents of a plurality of different logical structures can be prepared and managed readily.

In order to attain the object described above, according to an aspect of the present invention, there is provided a structured document preparation method for preparing a structured document in accordance with a predetermined document type definition, comprising the steps of describing, into the document type definition, a plurality of element declarations which respectively define a plurality of different logical structures and also a plurality of entity declarations which respectively designate the defined different logical structures, validating one of the described entity declarations to validate a corresponding one of the described element declarations, and preparing a structured document in the logical structure that is defined by the corresponding validated element declaration. In this instance, for each of the plurality of entity declarations, control information indicating whether the entity declaration is valid or invalid may be additionally described.

According to another aspect of the present invention, there is provided a computer-readable recording medium on which a structured document prepared in accordance with a predetermined document type definition is recorded, the structured document being recorded in a data file formed on the recording medium, the data file at least having a region in which the document type definition is recorded and another region in which contents of the document are recorded, a plurality of element declarations which respectively define a plurality of different logical structures and a plurality of entity declarations which respectively designate the defined different logical structures being described in the region in which the document type definition is recorded, for each of the plurality of entity declarations, information which indicates whether the entity declaration is valid or invalid being additionally described.

With the structured document preparation method and the computer-readable recording medium, a document type definition can be used commonly for a plurality of structured documents having different logical structures from each other. Consequently, when a document type definition is edited or in a like case, otherwise possible occurrence of a miss of editing in the document type definition of some of structured documents can be eliminated, and a high reliability and quality of structured documents can be achieved. Further, by selectively determining a desired logical structure from among the plurality of logical structures, a structured document having the selected logical structure can be produced and managed readily, and consequently, the structured document preparation method and the computer-readable recording medium are advantageous in that a high working efficiency ban be achieved.

The structured document preparation method and the computer-readable recording medium are further advantageous in that a desired logical structure can be selected readily from among the plurality of logical structures to prepare a structured document and the working efficiency can be augmented.

The plurality of different logical structures may include a logical structure form layout and a table form layout. Where the construction just described is employed, structured document having one of the logical structure form layout and the table form layout can be prepared readily. Consequently, the structured document preparation method and the computer-readable recording medium are advantageous in that a high workability can be achieved when the structured document is displayed and/or printed as a table and registered into a database for later utilization or in a like case.

Further, the structured document may be a Standard Generalized Markup Language (SGML) document and the document type definition may be a Document Type Definition (DTD) which defines a document structure of the SGML. Where the construction just described is employed, when the DTD of an SGML document is edited or in a like case, otherwise possible occurrence of a miss of editing in the DTD of some SGML document can be eliminated, and a high reliability and quality of the SGML documents can be achieved. Further, since an SGML document having a desired logical structure selected from among the plurality of logical structures can be prepared readily, the structured document preparation method and the computer-readable recording medium are advantageous in that a high working efficiency can be achieved.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
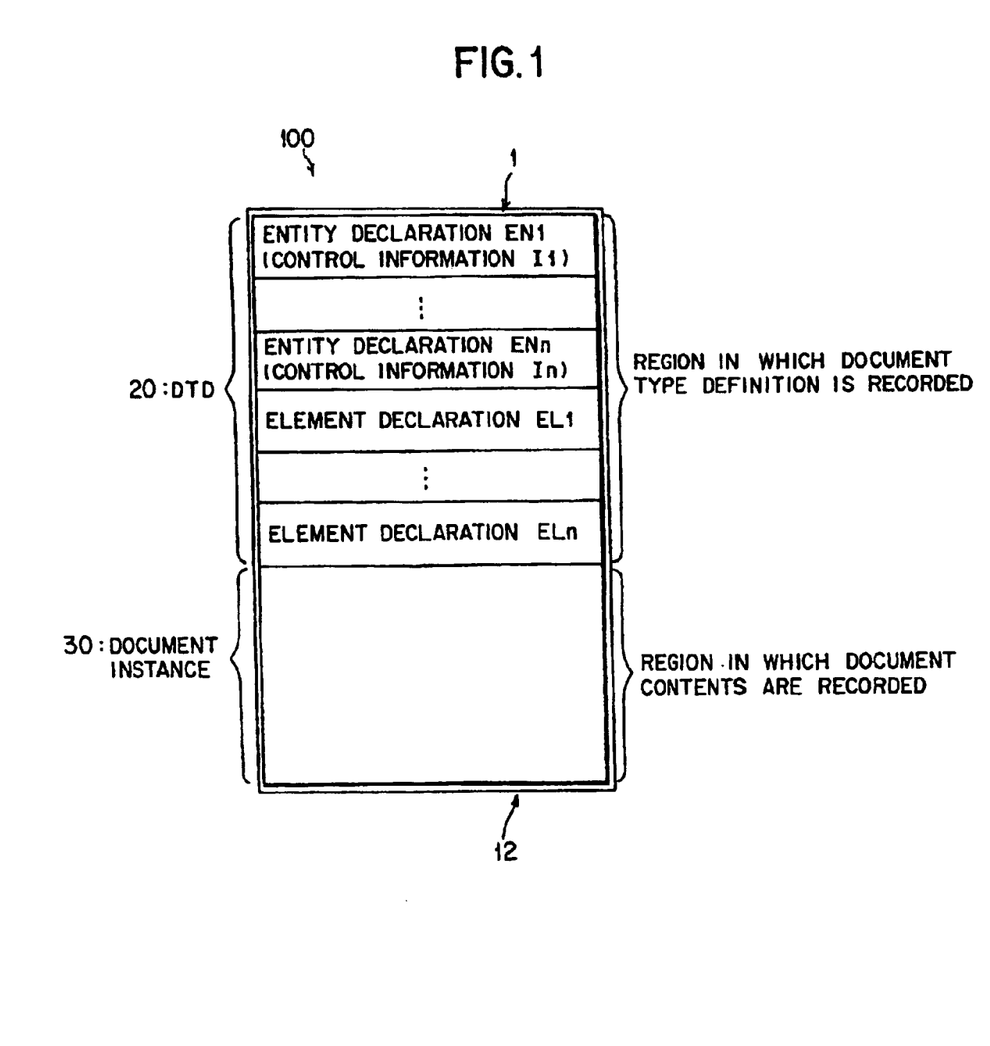
FIG. 1 is a diagrammatic view showing a structure of an SGML document prepared by a structured document preparation method according to an embodiment of the present invention.
Figure 2:
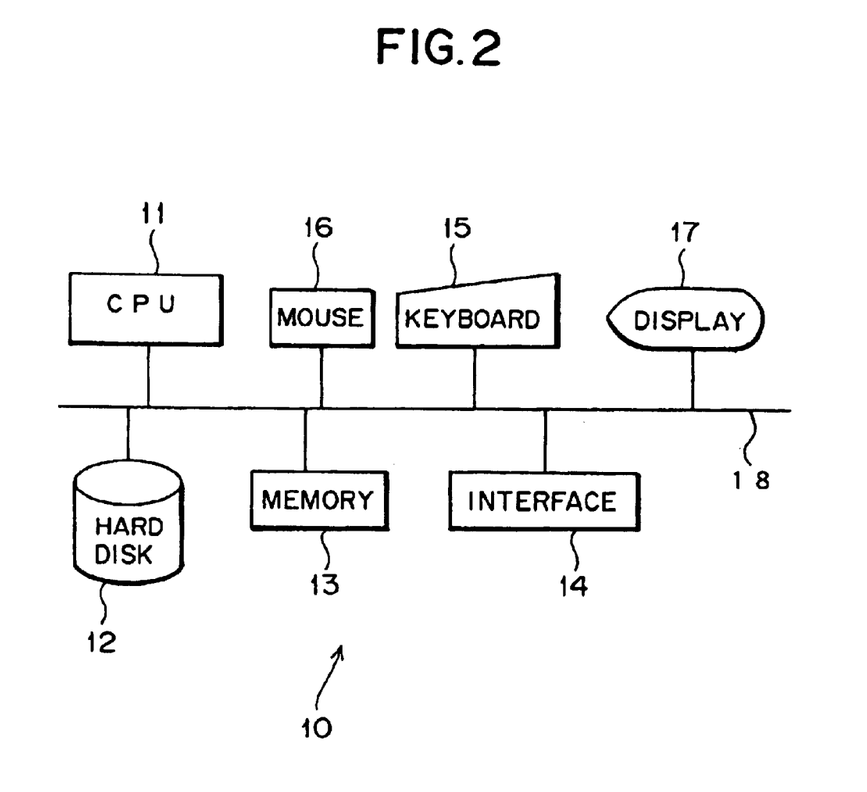
FIG. 2 is a block diagram showing a construction of a system (computer system) to which the structured document preparation method of the present invention is applied.

FIG. 1 shows a structure of an SGML document (structured document) prepared by a structured document preparation method according to an embodiment of the present invention, and FIG. 2 shows a construction of a system (computer system 10) to which the structured document preparation method of the present invention is applied.

Referring first to FIG. 2, the computer system 10 shown includes a CPU 11, a hard disk 12, a memory 13, an interface 14, a keyboard 15, a mouse 16, a display unit 17 and a bus 18 and produces an SGML (Standard Generalized Markup Language) which is a kind of structured document.

The memory 13 is an area to be used for expansion of data and so forth when the CPU 11 performs various calculation processes, and is formed from a RAM (Random Access Memory) or a like element.

The interface 14 allows communication of data between the computer system 10 and an external apparatus and is formed from, for example, a communication port or the like.

The keyboard 15 and the mouse 16 are inputting apparatus through which a composer of an SGML document inputs a document, various instructions and so forth and performs selection and other necessary processing. The display unit 17 displays a result of calculation processing by the CPU 11, an SGML document being prepared and other necessary information.

The CPU 11 performs various calculation processes and a process of preparation of an SGML document using data stored in the hard disk 12 and the memory 13 in accordance with instructions inputted from the keyboard 15 and/or the mouse 16. The CPU 11 further controls the interface 14, the display unit 17 and so forth.

The hard disk (magnetic disk apparatus) 12 is used to store various data and so forth, and an SGML document 100 (refer to FIG. 1) prepared in such a manner as hereinafter described is recorded into a data file 1 which is a predetermined region formed on the hard disk 12. In short, in the present embodiment, the hard disk 12 is a computer-readable recording medium on which the SGML document 100 is recorded.

It is to be noted that the SGML document 100 prepared in such a manner as shown in FIG. 1 can be recorded not only onto the hard disk 12 but also in a similar manner to some other recording medium such as a flexible disk, a CD-ROM, an optical disk, a magnetooptical disk or a magnetic tape and transported or stocked.

The SGML document 100 is a structured document prepared in accordance with a predetermined DTD (Document Type Definition). The SGML document 100 is recorded, for example, in the data file 1 formed on the hard disk 12 and includes an SGML declaration (not shown), a DTD 20, and a document instance (document contents) 30. In other words, the data file 1 at least includes a region in which the DTD 20 is recorded and another region in which the document instance 30 is recorded.

The SGML declaration describes types of character codes used in the document and various references with regard to whether or not an end tag can be omitted and so forth. The document instance 30 indicates contents of the document.

The DTD 20 defines the structure of the document and provides meanings to document structure elements arbitrarily, and describes an order of appearance of the document structure elements, a hierarchical relationship among the document structure elements, numbers of repetitions of the document structure elements and other factors. The DTD 20 uses element declarations (ELEMENT statements) and entity declarations (ENTITY statements) to define elements which compose the document and mutual relationships of the elements, that is, hierarchical relationships and the referring relationships of the elements.

More specifically, the DTD 20 includes a document type declaration (described hereinafter) which declares what document type definition is used, element declarations EL1 to ELn which define a logical structure of the SGML document, and entity declarations EN1 to ENn for designating logical structures.

Though not shown in FIG. 1, the DTD 20 further describes information regarding minimization which indicates a manner of abbreviation or omission of a tag, attribute declarations (ATTLIST statements) which define attributes of the elements, notation declarations which define processes for data, marks which are instructions to a processing system for the SGML, remarks and so forth.

In the DTD 20 of the SGML document prepared by the present method, a plurality of (n: n is a natural number equal to or greater than 2) different element declarations EL1 to ELn which define n different logical structures and n entity declaration EN1 to ENn for individually designating the plurality of different logical structures are described in a list. Further, control information Ii (i =1, 2, . . . , n) indicating whether the entity declarations EN1 to ENn are individually valid or invalid is additionally described individually for the entity declaration EN1 to ENn.

Figure 3:
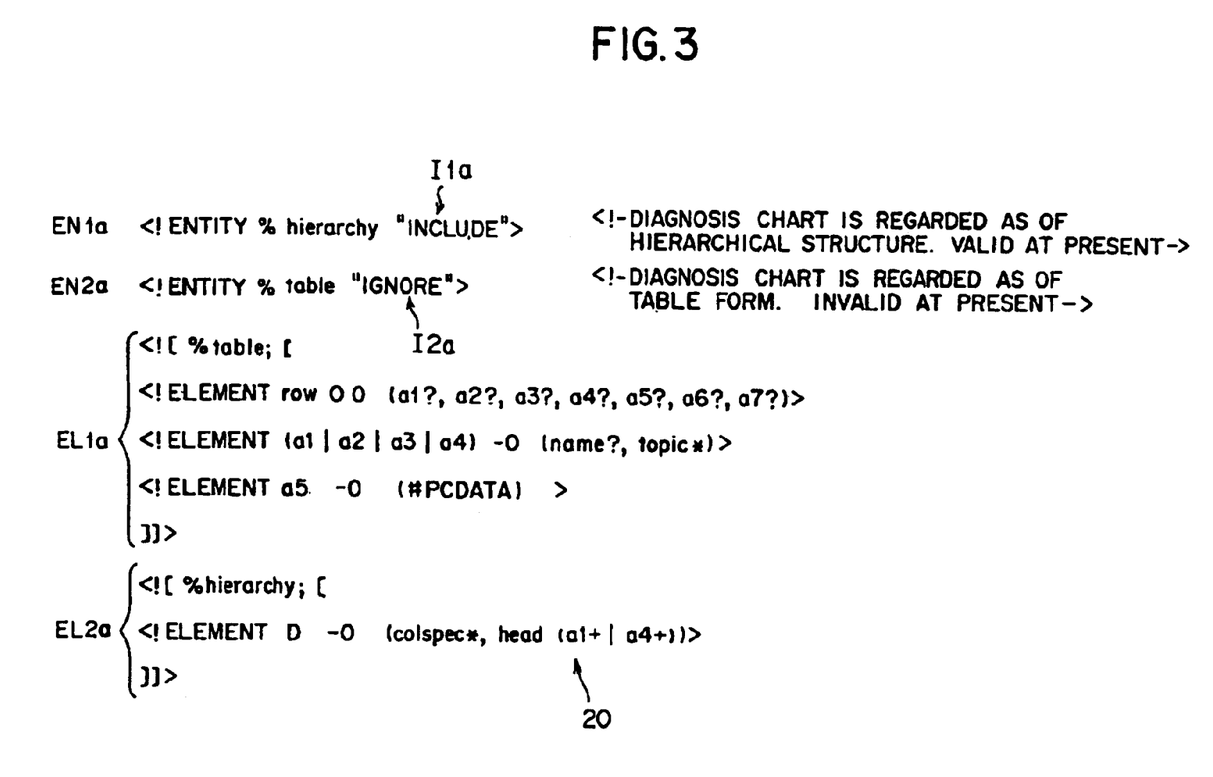
FIG. 3 is a view showing an example of description of a DTD produced by the structured document preparation method of the embodiment of the present invention.
Figure 4:
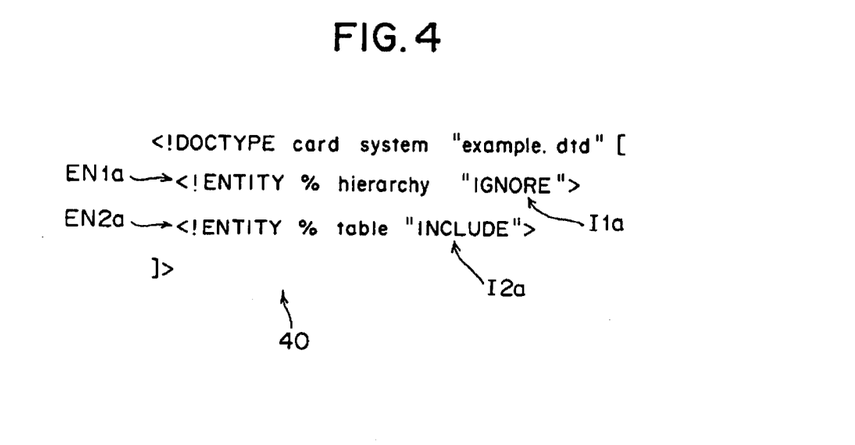
FIG. 4 is a view showing an example of description of a document type declaration of an SGML document prepared by the structured document preparation method of the embodiment of the present invention.

FIG. 3 shows an example of description of the DTD 20 prepared by the structured document preparation method of the present embodiment, and FIG. 4 shows an example of description of a document type declaration in an SGML document prepared by the structured document preparation method.

A detailed example of the DTD 20 prepared by the structured document preparation method of the present embodiment is described below with reference to FIGS. 3 and 4. It is assumed here that two different logical structures including a hierarchical structure form layout and a table form layout are available, and it is required to prepare SGML documents with the two different logical structures.

Referring first to FIG. 3, the entity declarations EN1$a$ and EN2$a$ in the DTD 20 shown are entity declarations (ENTITY statements) for designating the different logical structures from each other. More particularly, the entity declaration EN1$a$ declares an entity name "hierarchy", and the entity declaration EN2$a$ declares another entity name "table".

Further, either one of "INCLUDE" and "IGNORE" is described as control information I1$a$ or I2$a$ in each of the entity declarations EN1$a$ and EN2$a$.

In particular, "INCLUDE" is described in the control information I1$a$ of the entity declaration EN1$a$ shown in FIG. 3. Consequently, the entity declaration EN1$a$ declares the entity name "hierarchy" and declares (validates) with the control information I1$a$ of "INCLUDE" that the entity (element declaration EL2$a$) declared with the entity name "hierarchy" is valid.

Meanwhile, "IGNORE" is described in the control information I2$a$ of the entity declaration EN2$a$. Consequently, the entity declaration EN2$a$ declares the entity name "table" and declares (invalidates) with the control information I2$a$ of "IGNORE" that the entity (element declaration EL1$a$) declared with the entity name "table" is invalid.

The element declaration EL1$a$ defines an entity declared with the entity name "table" (ELEMENT statement). More particularly, the element declaration EL1$a$ defines an entity declared with the entity name "table" so that it may have a logical structure of the table form layout.

Meanwhile, the element declaration EL2$a$ defines an entity declared with the entity name "hierarchy" (ELEMENT statement). More particularly, the element declaration EL2$a$ defines an entity declared with the entity name "hierarchy" so that it may have a logical structure of the hierarchical structure form layout.

Figure 5:
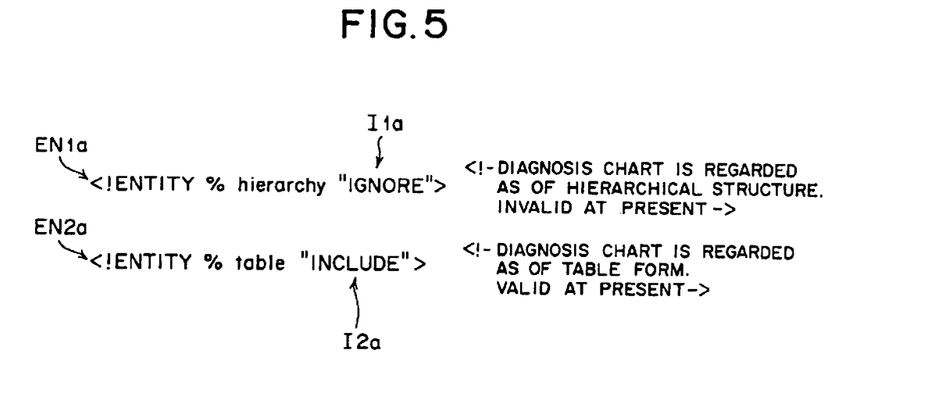
FIG. 5 is a view illustrating an example of description of an entity declaration for setting the logical structure of an SGML document to be prepared by the structured document preparation method of the embodiment of the present invention to a table form layout.

FIG. 5 shows an example of description of the entity declarations EN1$a$ and EN2$a$ for making an SGML document to be prepared by the structured document preparation method of the present embodiment have a logical structure of the table form layout. Referring to FIG. 5, "IGNORE" is described in the control information I1$a$ of one of the entity declarations EN1$a$ and EN2$a$ shown, that is, in the control information I1$a$ of the entity declaration EN1$a$, so that the entity declared with the entity name "hierarchy" (the element declaration EL2$a$: refer to FIG. 3) is invalidated. Further, "INCLUDE" is described in the control information I2a of the entity declaration EN2a so that the entity declared with the entity name "table" (the element declaration EL1a: refer to FIG. 3) is validated.

In short, the logical structure of the SGML document can be set to the table form layout by rewriting the control information I1a and I2a of the entity declarations EN1a and EN2a shown in FIG. 3 to that shown in FIG. 5.

For such rewriting of control information, for example, such a document type declaration as shown in FIG. 4 is used.

The document type declaration 40 shown in FIG. 4 includes entity declarations EN1a and EN2a similar to the entity declarations EN1a and EN2a shown in FIG. 3, respectively. Further, control information I1a and I2a is additionally described for the entity declarations EN1a and EN2a, respectively.

Thus, by using the document type declaration 40 shown in FIG. 4 as the document type declaration for the SGML document and describing "INCLUDE" in one of the control information I1a and I2a (in FIG. 4, in the control information I1a) while "IGNORE" is described in the other of the control information I1a and I2a (in FIG. 4, in the control information I2a), one of an entity declared with the entity name "hierarchy" and another entity declared with the entity name "table" can be validated.

Thus, a composer will observe a display on the display unit 17 and use the keyboard 15 and/or the mouse 16 to describe, in the DTD 20, an element declaration EL1a which defines a logical structure of the table form layout and an element declaration EL2a which defines a logical structure of the hierarchical structure form layout as well as entity declarations EN1a and EN2a for designating the element declarations EL1a and EL2a, respectively, in a list as seen in FIG. 3.

Then, the composer will set "INCLUDE" to the control information I1a (I2a) of one of the entity declarations EN1a and EN2a and set "IGNORE" to the other control information I2a (I1a). For example, the composer will set "INCLUDE" to the control information I1a of the entity declaration EN1a and set "IGNORE" to the control information I2a of the entity declaration EN2a as seen in FIG. 3 to set the logical structure of the SGML document 100 to the hierarchical structure form layout.

The composer may rewrite the control information I1a and I2a of the entity declarations EN1a and EN2a shown in FIG. 3 to that shown in FIG. 5 to set the logical structure of the SGML document 100 to the table form layout.

In this manner, with the structured document preparation method of the embodiment of the present invention, by describing, in the DTD 20, an element declaration EL1a which defines a logical structure of the table form layout and another element declaration EL2a which defines a logical structure of the hierarchical structure form layout as well as entity declarations EN1a and EN2a for designating the element declarations EL1a and EL2a, respectively, in a list and further by setting "INCLUDE" to the control information I1a (I2a) of one of the entity declarations EN1a and EN2a and setting "IGNORE" to the other control information I2a (I1a), an SGML document having one of logical structures of the hierarchical structure form layout and the table form layout can be prepared readily. Consequently, the structured document preparation method of the embodiment of the present invention is advantageous in that an operation of displaying or printing the prepared SGML document and/or registering the SGML document into a database for later utilization and so forth can be performed with a high workability. Further, since a desired logical structure can be selectively determined from between the two different logical structures and an SGML document 100 having the selected logical structure can be prepared readily and besides such SGML documents can be prepared and managed readily, the structured document preparation method of the embodiment of the present invention is advantageous also in that the working efficiency can be augmented.

Further, since a common DTD 20 can be used for SGML documents of a plurality of different logical structures, for example, for an SGML document 100 having a logical structure of the hierarchical structure form layout and another SGML document 100 having another logical structure of the table form layout, also when the DTD 20 is edited such as when a new document element (tag) is added in order to promote the convenience of use, it is required to only edit the DTD 20. Consequently, an otherwise possible miss as in editing of a DTD of an ordinary SGML document can be eliminated, and accordingly, the reliability and the quality of an SGML document can be augmented. Besides, the burden to a composer and so forth in management of an SGML document can be reduced.

It is to be noted that the present invention is not limited to the embodiment specifically described above, and variations and modifications can be made without departing from the scope of the present invention.

For example, while the foregoing description of the structured document preparation method of the embodiment is given in connection with the hierarchical structure form layout and the table form layout as a plurality of different logical structures, the present invention is not limited to this, but can be applied similarly as in the embodiment described above to any other case wherein SGML documents (structured documents) of the identical contents must be produced with various logical structures. Also in this instance, similar advantages to those of the embodiment can be achieved.

Further, while the foregoing description of the structured document preparation method of the embodiment is given in connection with the case wherein the structured document is an SGML document, the present invention is not limited to this, but can be applied similarly as in the embodiment described above to any other structured document such as, for example, an XML (Extended Markup Language). Also in this instance, similar advantages to those of the embodiment can be achieved.

What is claimed is:

1. A structured document creation method for creating a structured document in accordance with a predetermined document type definition, comprising:

preparing at least one document instance which presents a contents of said structured document, and a document type definition which defines a document structure of said structured document, including a plurality of element declarations which respectively define a plurality of types of logical structures for said one document instance, and a plurality of entity declarations which respectively designate said defined logical structures;

validating one of said entity declarations of said document type definition to validate a corresponding one of said element declarations of said document type definition; and creating said structured document having the contents of said document instance in said one logical structure that is defined by said corresponding validated element declaration.

2. A structured document creation method as claimed in claim 1, wherein, for each of the plurality of entity declarations, control information indicating whether the entity declaration is valid or invalid is additionally described.

3. A structured document creation method as claimed in claim 1, wherein the plurality of different logical structures include a logical structure form layout and a table form layout.

4. A structured document creation method as claimed in claim 2, wherein the plurality of different logical structures include a logical structure form layout and a table form layout.

5. A structured document creation method as claimed in claim 1, wherein the structured document is a Standard Generalized Markup Language document and the document type definition is a Document Type Definition which defines a document structure of the Standard Generalized Markup Language.

6. A structured document creation method as claimed in claim 2, wherein the structured document is a Standard Generalized Markup Language document and the document type definition is a Document Type Definition which defines a document structure of the Standard Generalized Markup Language.

7. A structured document creation method as claimed in claim 3, wherein the structured document is a Standard Generalized Markup Language document and the document type definition is a Document Type Definition which defines a document structure of the Standard Generalized Markup Language.

8. A structured document creation method as claimed in claim 4, wherein the structured document is a Standard Generalized Markup Language document and the document type definition is a Document Type Definition which defines a document structure of the Standard Generalized Markup Language.

9. A computer-readable recording medium on which a structured document created in accordance with a predetermined document type definition is recorded, said medium comprising:

the structured document being recorded in a data file formed on said recording medium;

the data file at least having a region in which the document type definition which defines a document structure of said structured document is recorded and another region in which at least one document instance which presents contents of the document are recorded;

a plurality of element declarations which respectively define a plurality of types of logical structures for said one document instance, and a plurality of entity declarations which respectively designate said defined logical structures being described in said region in which the document type definition is recorded;

for each of the plurality of entity declarations, information which indicates whether the entity declaration is valid or invalid being additionally described.

10. A computer-readable recording medium as claimed in claim 9, wherein the plurality of different logical structures include a logical structure form layout and a table form layout.

11. A computer-readable recording medium as claimed in claim 9, wherein the structured document is a Standard Generalized Markup Language document and the document type definition is a Document Type Definition which defines a document structure of the Standard Generalized Markup Language.

12. A computer-readable recording medium as claimed in claim 10, wherein the structured document is a Standard Generalized Markup Language document and the document type definition is a Document Type Definition which defines a document structure of the Standard Generalized Markup Language.

13. A computer-readable medium storing a program which, when executed by a computer, causes the computer to execute functions of a structured document creation method for creating a structured document in accordance with a predetermined document type definition, comprising:

preparing at least one document instance which presents a contents of said structured document, and a document type definition which defines a document structure of said structured document, including a plurality of element declarations which respectively define a plurality of types of logical structures for said one document instance, and a plurality of entity declarations which respectively designate said defined logical structures;

validating one of said entity declarations of said document type definition to validate a corresponding one of said element declarations of said document type definition; and creating said structured document having the contents of said document instance in said one logical structure that is defined by said corresponding validated element declaration.

14. A computer system creating a structured document in accordance with a predetermined document type definition, comprising:

a processor preparing at least one document instance which presents a contents of said structured document, and a document type definition which defines a document structure of said structured document, including a plurality of element declarations which respectively define a plurality of types of logical structures for said one document instance, and a plurality of entity declarations which respectively designate said defined logical structures, validating one of said entity declarations of said document type definition to validate a corresponding one of said element declarations of said document type definition, and creating said structured document having the contents of said document instance in said one logical structure that is defined by said corresponding validated element declaration;

a memory storing the structured document; and a display displaying the structured document, wherein the structured document is an XML document.

* * * * *

UNITED STATES PATENT AND TRADEMARK OFFICE
CERTIFICATE OF CORRECTION

PATENT NO. : 6,922,697 B1
DATED : July 26, 2005
INVENTOR(S) : Seishi Suehira

It is certified that error appears in the above-identified patent and that said Letters Patent is hereby corrected as shown below:

Title page,
Item [56], References Cited, U.S. PATENT DOCUMENTS, delete "7,510,718" and insert -- 6,519,617 --.

Signed and Sealed this

Fourteenth Day of March, 2006

JON W. DUDAS
*Director of the United States Patent and Trademark Office*